United States Patent [19]

Spethmann et al.

[11] Patent Number: 4,463,574

[45] Date of Patent: Aug. 7, 1984

[54] OPTIMIZED SELECTION OF DISSIMILAR CHILLERS

[75] Inventors: Donald H. Spethmann, Arlington Heights; Lucy T. Y. Emerson, Barrington, both of Ill.

[73] Assignee: Honeywell Inc., Minneapolis, Minn.

[21] Appl. No.: 358,497

[22] Filed: Mar. 15, 1982

[51] Int. Cl.³ .............................. F25B 7/00; H02J 1/00
[52] U.S. Cl. .................................. 62/175; 236/1 EA; 307/39; 364/156; 364/505
[58] Field of Search .............. 62/175, 510, 203, 228.5; 236/1 EA; 307/39; 364/141, 156, 493, 505

[56] References Cited

U.S. PATENT DOCUMENTS 4,069,675 1/1978 Adler et al. ...................... 364/156 X
4,210,957 7/1980 Spethmann et al. .............. 62/175 X

FOREIGN PATENT DOCUMENTS

56-0157745 12/1981 Japan ................................ 62/157

Primary Examiner—William E. Wayner
Attorney, Agent, or Firm—Trevor B. Joike

[57] ABSTRACT

A system for meeting building air conditioning load conditions by optimally selecting a combination of chillers having dissimilar efficiency characteristics, the system having a load sensor for sensing building load a refrigerant head sensor for sensing refrigerant head of the chillers, and a controller connected to the load sensor and to the refrigerant head sensor for sorting the chillers according to their efficiency characteristics data with the chiller having a minimum kw/ton versus capacity point being ranked first and for selecting a combination of the chillers which will require a minimum energy input to meet building load conditions.

21 Claims, 8 Drawing Figures

STEP 1  MACHINES RANKED BY MIN. COST AND START WITH
NO. 1 AT MIN. COST

STEP 2  INCREASE CAPACITY UNTIL LOAD MET OR END OF
CAPACITY OR NEXT MINIMUM COST EQUALLED.

STEP 3  ADD SECOND MACHINE AT MIN. COST CAPACITY AND
COMPARE NEW CAPACITY TO LOAD

STEP 4A  REDUCE MACHINE 1 OR 2 BY STEPS THAT ARE THE GREATEST
(CAP>LOAD)  COST REDUCTION (EX. SHOWS THIS AS #1)

STEP 4B  INCREASE CAPACITY LIKE STEP 2
(CAP<LOAD)

STEP 5  ADD THIRD MACHINE, (#2 at end of capacity) LIKE STEP 3

STEP 6  REDUCE CAPACITY BY GREATEST REDUCTION STEP OR
BY LEAST INCREASE STEP (STEP 7)

OPTIMIZED SELECTION OF DISSIMILAR CHILLERS

BACKGROUND OF THE INVENTION

The present invention relates to the optimization of dissimilar chillers in a building air conditioning system in order to meet building load conditions with a minimum expenditure of energy.

The air conditioning systems of large buildings typically comprise a plurality of chillers which are connected both to cooling coils located within fan system ducts and one or more cooling towers located outside of the building. The fan system will typically comprise a fan located in a duct which draws air from an outdoor air duct and from a return air duct, passes this air over various heat exchange coils and, perhaps humidifiers, and supplies this treated air to the zones connected to the fan system. The heat exchange coils may include both cooling and heating coils and the ducts connecting this source of treated air to the individual offices or spaces to be supplied by the fan system may include dampers and/or reheat coils for controlling the amount of treated air supplied to the zone and for further treatment of the air. Chilled water is then circulated between the chiller and the cooling coil in this fan system for cooling the air moving through the duct system. The chiller is also connected to a cooling tower where a separate supply of water is circulated between the chiller and the outside of the building. Freon is typically circulated within the chiller for transferring the heat content of the water circulated to the cooling coil to the water circulating between the chiller and the cooling tower. Thus, the cooling tower then delivers this heat to the outside of the building.

Large chiller plants within such buildings are composed of multiple chillers, pumps and cooling towers. The total chiller plant is sized to supply maximum load. For intermediate loads, the choice of the proper combination of chillers to meet load conditions can have a significant impact on total plant efficiency. In order to improve total plant efficiency, the selection of the proper combination of chillers to meet load conditions must be optimized. U.S. Pat. No. 4,210,957 discloses an optimization system for a plural chiller plant where the chillers all have similar efficiency characteristics. The present invention is directed to those chiller plants which are comprised of chillers having dissimilar efficiency characteristics. In the present invention, the part load characteristics of chillers and how they interact in meeting a given load are the essential variables in the optimized decision making process.

The electrical energy input necessary to produce a given amount of cooling is the primary variable. The electrical energy input will vary not only with cooling load but also with refrigerant head. Refrigerant head is the pressure change which the refrigerant compressor must produce. Thus, the energy required by the compressor for a given load is directly related to the magnitude of the refrigerant head. The refrigerant head is the difference between the condensor pressure and the evaporator pressure. Since condensor pressure is related to the inlet condensor water temperature and evaporator pressure is related to the outlet chilled water temperature, the refrigerant head can be indicated by condensor supply temperature minus chiller supply temperature. And the rate of heat removal from the building chilled water system is the cooling load on the chiller plant. Cooling load is normally represented in tons which are 12,000 BTU per hour. The normal measurement of this load is at each chiller by measuring chilled water flow rate and temperature drop across the chiller using the formula BTU load=flow (GPM)×(temperature in−temperature out). Tons of load is then the BTU load divided by 12,000.

The chiller plant of larger buildings, or complexes of buildings, is usually the largest single user of energy in the facility. It provides the chilled water used by fan systems to air condition spaces. Chiller plants not only use the most energy supplied to the building but are the greatest influence on electrical demand charges. Chiller plants typically have multiple chillers and associated pumps and cooling towers. How and when this equipment is used can make a significant difference in the overall chiller plan efficiency. Specific plants will have variations in chiller type, size and system arrangement that will influence optimum control strategy. Moreover, actual operating environment and equipment condition are major influences on the actual part load energy efficiency characteristics of chillers, meaning that the efficiency characteristics of chillers will change depending upon operating environment and equipment usage. Thus, not only must the chillers be selected for maximum efficiency based upon refrigerant head and building load, but the efficiency characteristics stored in the system must be periodically updated to reflect actual conditions. While the function of a chiller plant is to provide the amount of cooling required by the air conditioning load, the function of the chiller plant optimization control system is to determine the best plant mode of operation for changing loads. The multiple chiller selection using the appropriate part load characteristics is an analysis that determines the best combination of chillers to meet existing or anticipated loads. Although the present invention can be used with any chiller plant that uses more than one chiller, it is particularly useful for chiller plants having dissimilar chillers and/or chillers having dissimilar efficiency characteristics.

SUMMARY OF THE INVENTION

Thus, the present invention involves a system for meeting building air conditioning load conditions by optimally selecting a combination of chillers having a load sensor for sensing building load, a refrigerant head sensor for sensing refrigerant head of the chillers, and a controller connected to the load sensor and to the refrigerant head sensor for sorting the chillers according to their efficiency characteristics with the chiller having the minimum kw/ton versus capacity point being ranked first and for selecting a combination of the chillers which will require a minimum energy input to meet building load conditions.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
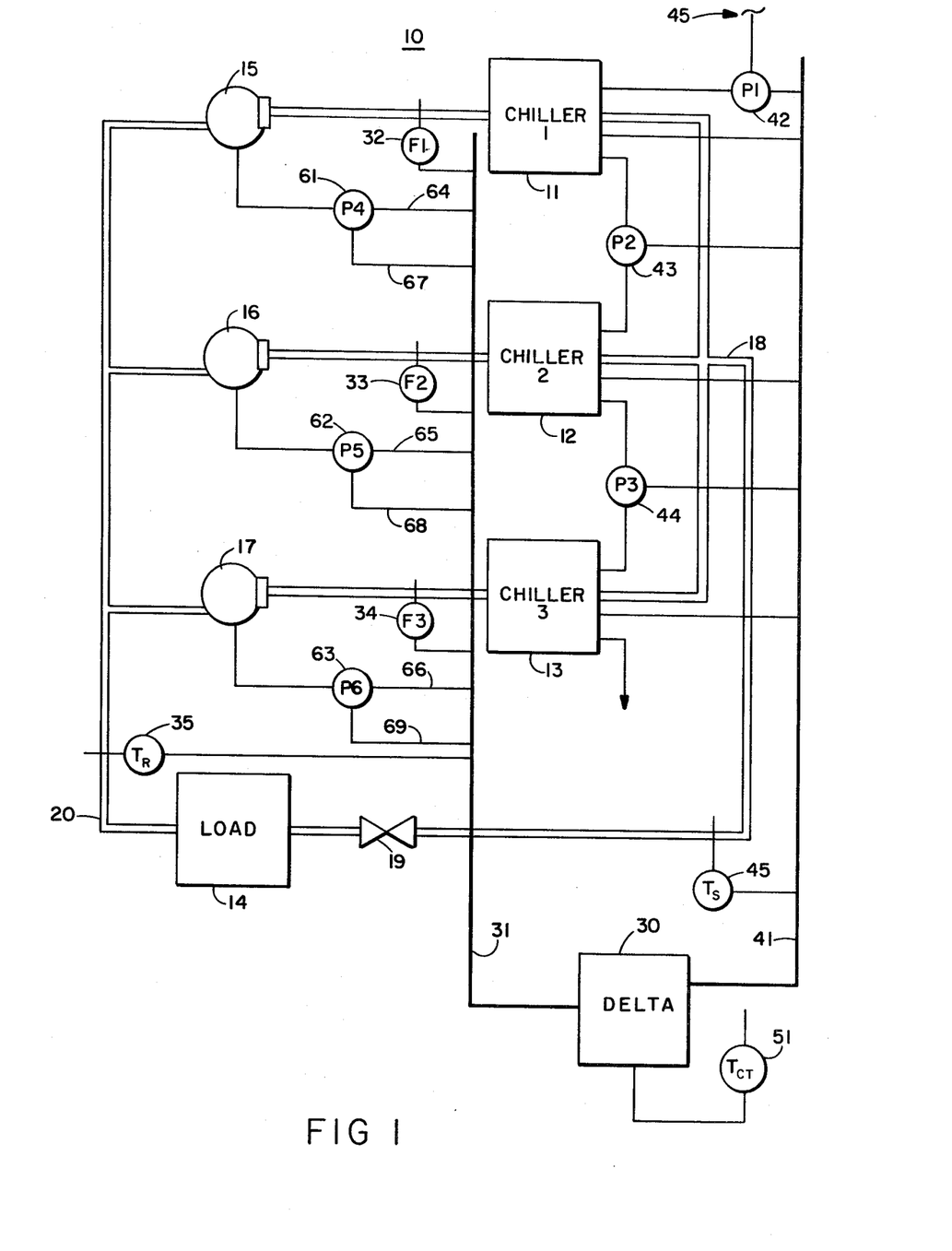
FIG. 1 shows a typical chiller plant which can be controlled by the present invention.

In FIG. 1, chiller plant 10 is shown as comprised of chillers 11, 12 and 13 although it should be clear that fewer or more chillers can be included in the chiller plant. Load 14 represents the building load which is the heat within the building which must be transferred to the chilled water and expelled by the chiller plant system to the cooling towers. Water is circulated to chillers 11, 12 and 13 by corresponding pumps 15, 16 and 17. These pumps may be either constant volume pumps or variable pumps. Chillers 11, 12 and 13 chill the water which is returned from the building by pumps 15, 16 and 17 and supply this chilled water to a common supply line 18. This chilled water is then supplied through valve or restriction 19 to the various cooling coils located in the fan systems within the building and represented by load 14. Heat is transferred from the air within the building to the chilled water and returned to the chillers by return line 20 and pumps 15–17.

The heart of the control system shown in FIG. 1 is the Delta system 30 which may be any of the Detal systems manufactured by Honeywell Inc, for example, the Delta 5600. The Delta 5600 comprises a computer which may a Honeywell Level 6 Minicomputer connected to a plurality of data gathering panels to which the various sensors and control systems can be connected. However, for simplicity, the various sensors and control loads in the system shown in FIG. 1 have been shown to be connected to the Delta by control cables.

The first cable 31 has lines for connecting flow sensors 32, 33 and 34 to the Delta system so that measurements of the flow in gallons per minute in the input lines to respective chillers 11, 12 and 13 can be measured. Cable 31 has a line connected to temperature sensor 35 for determining the temperature of the return water in line 20 so that building load can be determined. In the system shown in FIG. 1, pumps 15, 16 and 17 are variable pumps. As will be shown hereinafter, it may be desirous to measure the power of each pump particularly in determining the part load characteristics of chillers 11, 12 and 13. Thus, power is supplied to pumps 15, 16 and 17 under control of lines 64, 65 and 66 of cable 31 and controlled by Delta 30. Meters 61, 62 and 63 measure the power supplied to pumps 15, 16 and 17 convey their measurements to Delta 30 over respective lines 67, 68 and 69 of cable 31.

Second cable 41 is connected to watt meters 42, 43 and 44 which measure the electrical energy requirements of their corresponding chillers 11, 12 and 13. Chillers 11, 12 and 13 are supplied from source of electrical energy 45 by appropriate electrical cables, and watt meters 42, 43 and 44 monitor the energy requirements of their respective chillers. Supply water temperature sensor 45 is connected to a line in cable 41 and measures the temperature of the supply water from chiller plant 10 before it is supplied to the building load 14. Supply water temperature sensor 45 is useful in determining building load 14. Moreover, each chiller is connected to a corresponding line in cable 41 so that the chillers can be controlled by Delta 30.

Control system 30 is connected further to a cooling tower temperature sensor 51.

Figure 2:
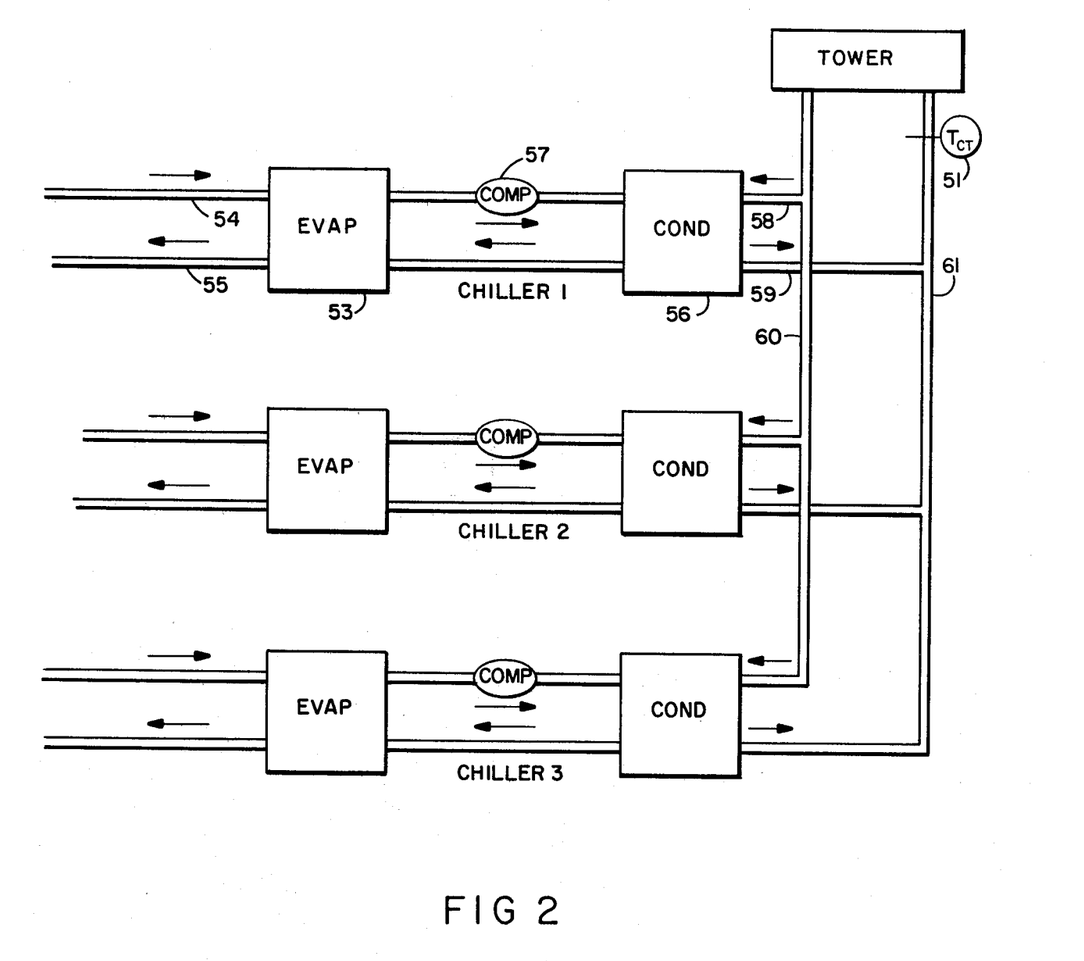
FIG. 2 shows some details of typical chillers and how they can be connected for chilling the chilled water and for expelling building heat to the cooling tower.

FIG. 2 shows the details of each of the chillers of FIG. 1 more fully although it should be recognized that different types of chillers can also be used. Each chiller comprises an evaporator section 53 which receives return water in return line 54 and supplies chilled water through line 55 to the common chilled water supply line 18. The chilled water circulating through return line 54 and supplied through outlet line 55 is chilled by a heat exchange medium, typically Freon, circulated between evaporator 53 and condenser 56 by compressor 57. In order to expel the heat picked up by the Freon from the water in return line 54, condenser 56 has cooling tower water circulating through it. Thus, condenser 56 receives cooling tower water from line 58 and extracts the heat from the Freon line. The warmer cooling tower water is sent back to the cooling tower by output line 59. As can be seen, each condenser is connected to condenser supply line 60 and to condensor return line 61. Temperature sensor 51 measures the temperature of the water in common condensor return line 61. Furthermore, each of the input lines 54 to the evaporators of the chiller are supplied by pumps 15, 16 and 17 respectively.

Control system 30 utilizes the return water temperature as sensed by sensor 35, the chilled water supply temperature as sensed by sensor 45, and the flow rates for each chiller as determined by flow sensors 32, 33 and 34 for determining building load. Refrigerant head is then determined by the difference between the chilled water supply temperature as sensed by sensor 45 and the temperature of the water being returned by the condensors to the cooling tower as determined by sensor 51. Finally, the energy required by each chiller is determined by watt meters 42, 43 and 44 and the energy required by pumps 15, 16 and 17, if they are variable, is determined by watt meters 61, 62 and 63. This information is then utilized for making up the part load efficiency characteristic tables for each of the chillers connected in chiller plant 10.

Figure 3:
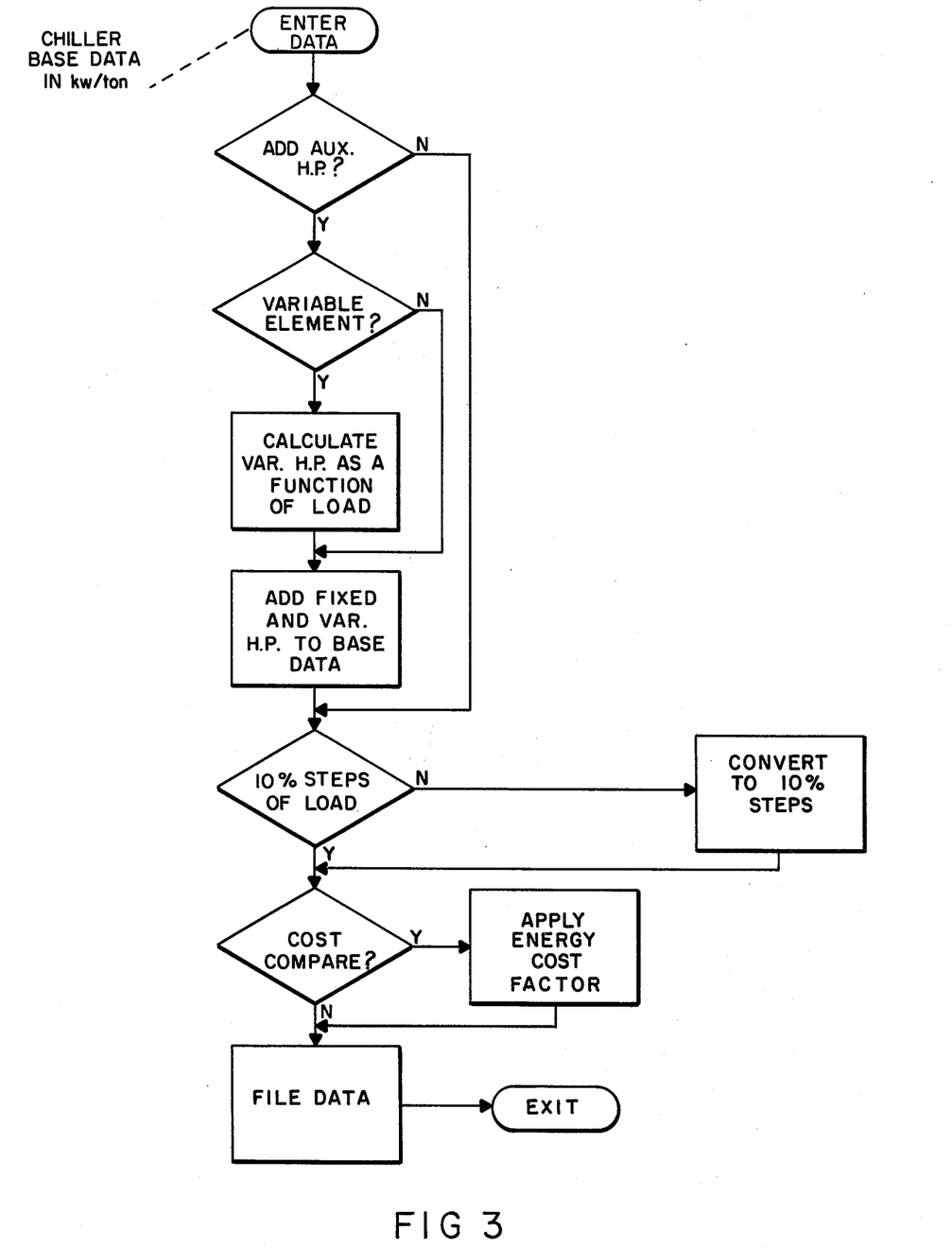
FIG. 3 is a flow chart showing how data is entered into the control system of FIG. 1.
Figure 4:
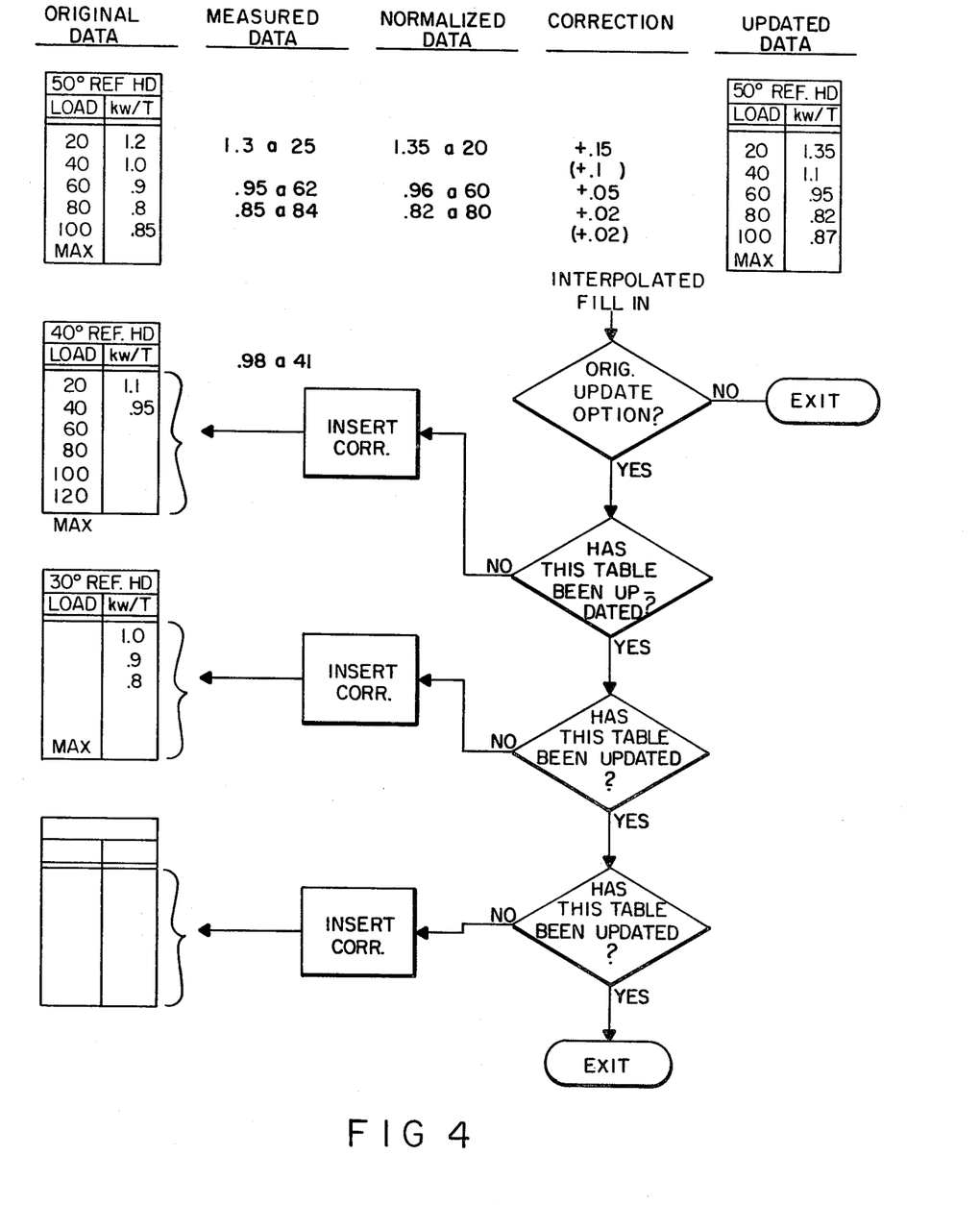
FIG. 4 is a flow chart showing how this data is used to update the part load characteristic tables used in the control system shown in FIG. 1.

A sample of these tables for one chiller is shown in FIG. 4. Each chiller would have a similar set of tables. At system set up, the tables are empty and are filled with data supplied by the chiller manufacturer. Since chiller characteristics may change as a function of time and environment, the tables are periodically updated. Whether the manufacturer's data or updated data is inserted into the tables, the routine represented by the flow chart of FIG. 3 is used to store data in correction data files prior to insertion into the tables. Raw data is modified in three ways dependent upon system configuration. Fixed and variable horsepower may be added to the raw data, the raw data may be converted to 10% steps, and/or an energy cost factor may be applied to the data.

As shown in FIG. 3, manufacturing or measured data is entered and a decision is made whether or not there is additional auxiliary horsepower associated with the chiller under consideration. Thus, if each chiller does not have its own dedicated pump, then the answer to this decision is no. However, for the system shown in FIG. 1, each chiller has its own associated pump and, therefore, the answer to the first decision box is yes. It must next be determined whether or not this pump is variable. If it is variable, then control system 30 can use meters 61, 62 and 63 which monitor the power to the respective pumps as supplied by lines 64, 65 and 66. Next, if the pump is a variable pump and the variable horsepower as a function of load has been calculated by use of meters 61, 62 and 63, controller 30 will add the variable horsepower to the kw/ton information of the associated chiller (base data). However, if the pumps are constant flow pumps, controller 30 will add the fixed horsepower requirements for constant flow pumps to the kw/ton information of the associated chiller.

It is next determined whether or not the part load characteristic tables as shown in FIG. 2 and to be discussed hereinafter are in 10% steps. If not, the information is converted to 10% steps.

Controller 30 next determines whether or not the cost of the specific chiller is comparable to the cost of the other chillers. Thus, there is a distinction in the amount of cost required, for example, between steam chillers and electric chillers. If the chillers are dissimilar from a cost standpoint, then the controller applies an energy cost factor so that the different types of chillers can be compared. As a result, the information or data is entered into correction data files before they are used to fill in the tables of FIG. 4.

The data stored in the correction data file is entered into the tables according to FIG. 4. The tables shown in FIG. 4 are simplified because the loads shown therein are in 20% steps when in actuality controller 30 assembles this information in 10% steps. These tables show, for example, what might typically be the manufacturer's data for new equipment. The tables for 20°, 30° and 40° refrigerant heads are only partially filled for the sake of simplicity but, it will be understood, are complete at initial set up. As shown, for each chiller there are, for example, four part load characteristic efficiency tables by refrigerant head and each table shows the kilowatt per ton (kw/ton) or energy requirement at each step of building load.

As mentioned previously, the manufacturer's original data for unused equipment may change according to environment and equipment usage. FIG. 4 shows how measured information can be normalized and used to replace the original information stored in the part load characteristics. When more than half the data bins or correction data files associated with any particular table are filled, the routine of FIG. 4 is then used to modify the data in the previous part load characteristic table for that particular table. As an example, more than half the data bins associated with the 50° table are filled with measured data. This data must be normalized since, as shown, the actual building load at which the measured data was taken do not conform with the data as stored in the refrigerant head. Thus, the normalized data is shown in kw/ton matching the chiller loads as stored in the tables. Because not all of the load values have measured data associated therewith, the difference between the normalized data and the previously stored data is calculated so that the data (shown in parenthesis) associated with chiller loads for which no data was measured can be interpolated. The correction factors are then applied to the old data in the table.

These correction factors are then applied to the old data depending upon whether or not the original update option has been selected. If not, then the purchaser of this system has determined that only the table of the refrigerant head for which measured data has been accumulated is to be updated and, therefore, the table is updated and the routine exits.

However, if the original update option is selected, then for any given chiller, controller 30 will use the correction factors derived for that chiller at the measured refrigerant head to update all of the other tables for that chiller if the tables have not been previously updated, i.e. if the manufacturer's original data has not been updated. Although for simplicity FIG. 4 does not show a decision box for the 50° refrigerant head table, there will be a decision box for this table. Thus, if the original data option has been selected and if not enough data bins for the other tables are filled with measured data, the routine of FIG. 4 will next determine if the 40° table has previously been updated. If not, then the original manufacturer's data is still in the 40° table. Therefore, the 50° table correction factors are applied to the 40° table as well. If the 40° table has previously been updated, the routine goes directly to the 30° table and so on. The advantage of this approach is that if the building load remains relatively constant over a relatively long period of time, there will be no measured data for the off chillers and/or for other refrigerant heads. Thus, the original data will not be updated and may later prove to be inaccurate. However, the user of the machine at the time of system set up can determine that the information accumulated for one table will not be used to update the other tables. Thus, when all the tables have been updated once, then only tables having measured data associated therewith will thereafter be updated.

Figure 5:
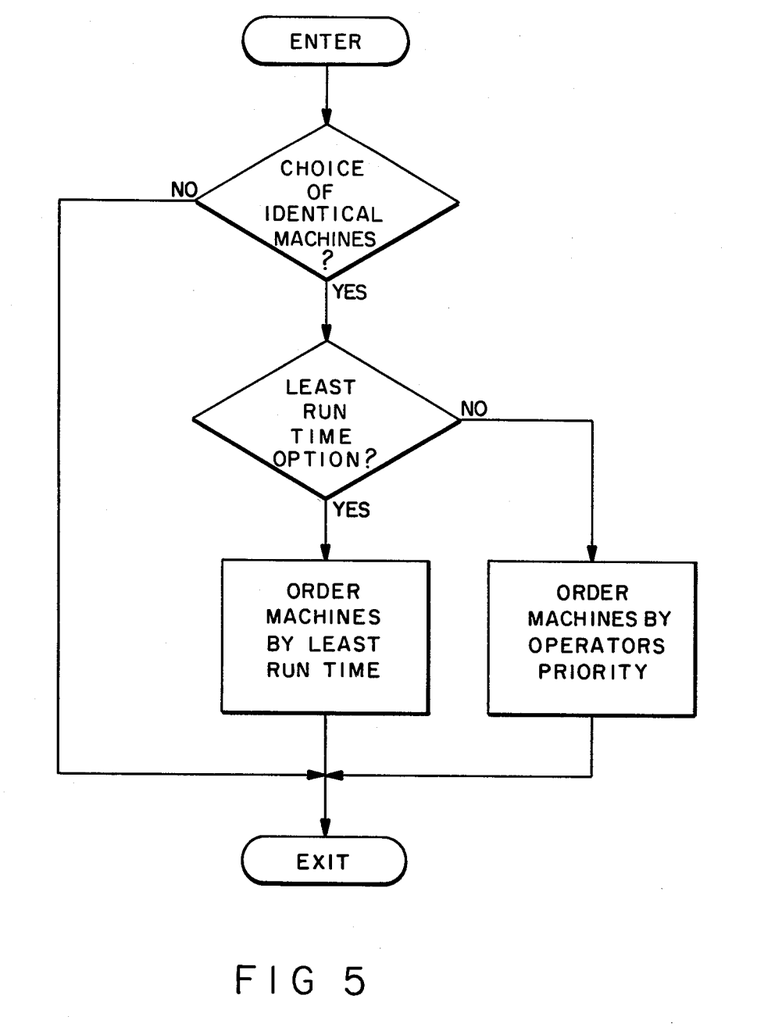
FIG. 5 is a flow chart showing how the control system of FIG. 1 uses the least cost combination of chillers to meet load conditions.
Figure 6:
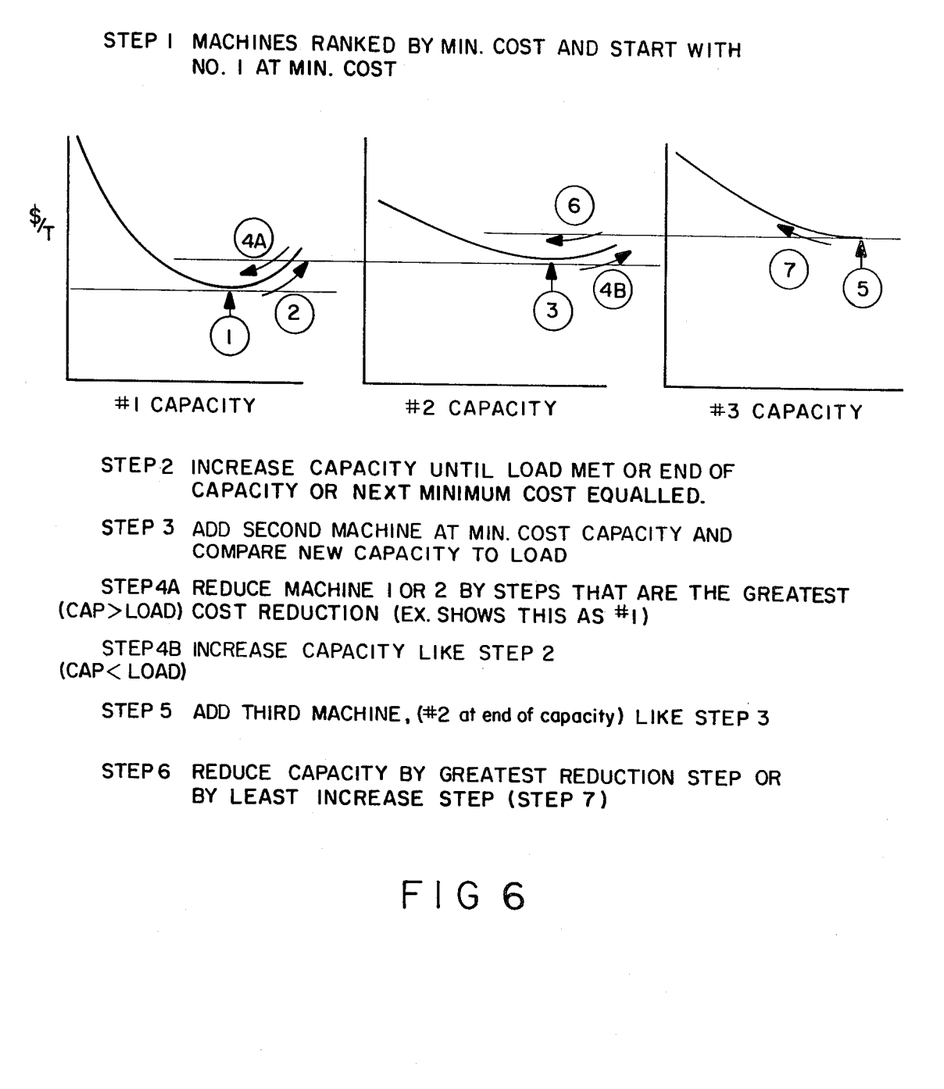
FIG. 6 shows a step-by-step process for determining the least cost combination of chillers to meet building load; and, FIGS. 7 and 8 show, in flow chart form, how the process of FIG. 6 is further used to determine the least cost combination of chillers.
Figure 7:
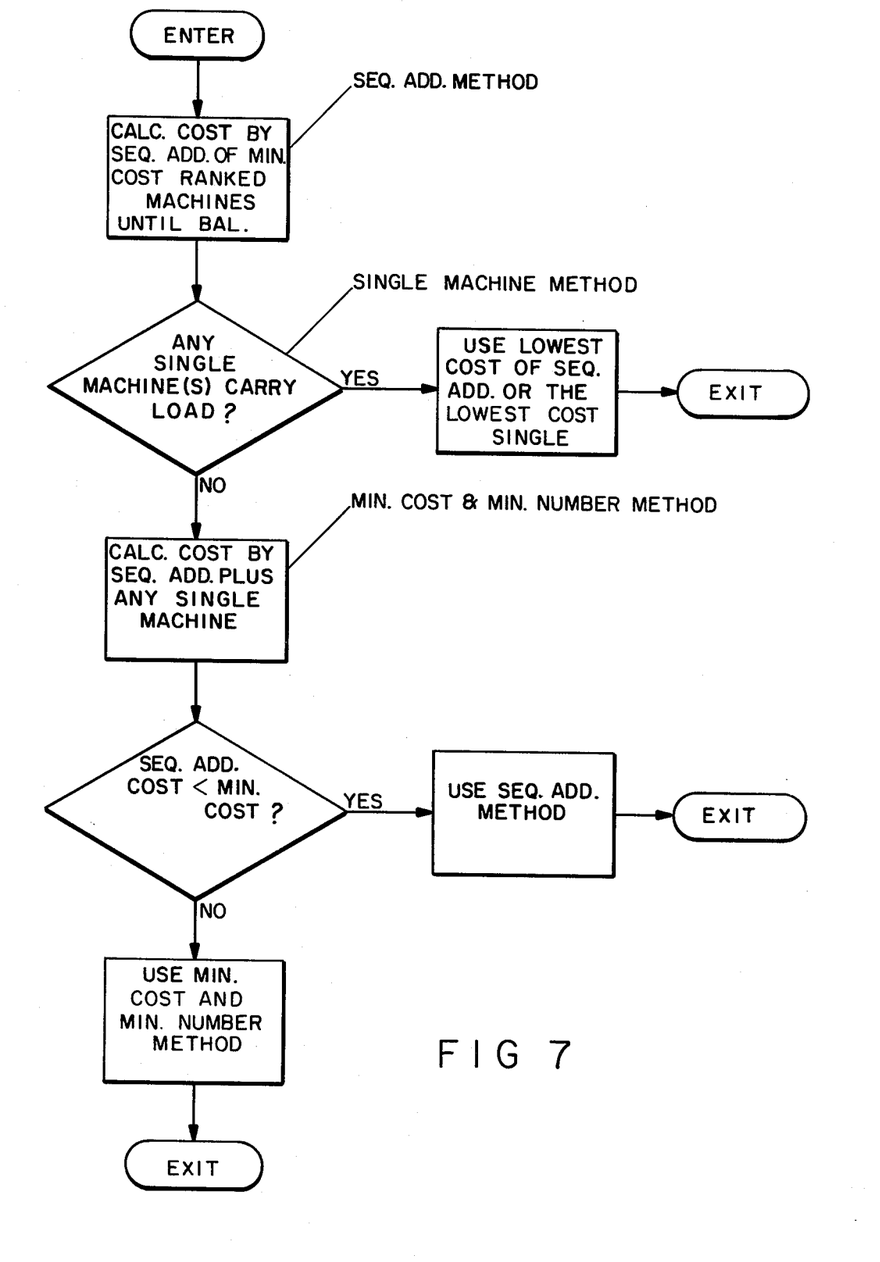

FIGS. 5 and 6 show how controller 30 uses the data for each chiller and each step of refrigerant head which it has accumulated. Controller 30 first determines whether or not there is a choice of identical machines (chillers) represented by measurement of one machine and orders the sequence of identical machines relative to each other as shown in FIG. 5. This ordering is accomplished in one of two ways. If the least run time option is selected, the machines are ordered with the least run time machine first. Thus, if one of the identical machines is turned on to meet building load, it will be the machine which has the least run time. In this manner, run time is evenly spread between machines. If this option is not selected, then the machines are ordered according to the operator. Controller 30 then in the manner shown in FIG. 6 orders the characteristic tables of all machines including each identical machine by ranking of lowest minimum cost. The group of identical machines are together in the sequence established by FIG. 5. The analysis is made in the manner described in FIG. 6, and is further checked for other possible combinations that might give lower cost results as shown in FIG. 7.

FIG. 6 is a shorthand representation of how the chillers are selected to meet building load. First, the machines are ranked by minimum cost and then are sorted with the machine having the minimum cost ranked as #1, the machine with the next minimum cost ranked as #2 etc. Thus, the curves of the three chillers shown in FIG. 1 may be as shown in the FIG. 6. FIG. 6 shows the dollar per ton versus capacity curves, i.e. efficiency characteristic curves, for each chiller. Chiller 1 has the lowest point, chiller 2 has the second lowest point, etc. Next, assuming a defined building load and starting with machine #1, the capacity of the machine is increased until the building load is met or the end of the capacity of the machine is reached or the next minimum cost level is reached. Thus, the capacity of machine #1 is increased following arrow 2 until the minimum cost level of chiller #2 is reached. Then, chiller #2 is added at its minimum cost capacity and a comparison is made between the capacities of chillers #1 and #2 to the building load.

If the capacity of chillers #1 and #2 at this point is greater than building load, then, the capacity of chillers #1 or #2 is decreased or reduced by steps depending upon which reduction will result in the greatest cost reduction. Since the curve of chiller #1 between its lowest point and the minimum cost level of chiller #2 is greatest, reducing chiller #1 along arrow 4A will have the greatest cost reduction. Thus, chiller #1 is reduced by steps until building load is met by chiller capacity. It may be that the shape of the curve associated with chiller #1 dictates that its first step will result in the greatest cost reduction but that a second step reduction in chiller #2 will result in greater cost savings than an additional step reduction in chiller #1. If so, chiller #2 is next reduced by a step, and so on. Thus, controller 30 will step these two chillers looking for the lowest cost to meet building load.

If on the other hand the capacity of chillers #1 and #2 at this point is less than building load, then the capacity of chiller #2 is increased along arrow 4B as in STEP 2.

If the addition of chiller #2 cannot meet the load and chiller #2 has been stepped to either the end of its capacity or until the next minimum cost level of chiller #3 is reached, chiller #3 will then be added as in STEP 3. If the capacity of these three chillers is greater than building load, then the capacities of the chillers must be reduced by steps with the chiller having the greatest slope at the present step on its characteristic curve being reduced first. Thus, this routine is performed for each of the chillers to be added or subtracted (in subtraction, the reverse order is used) until the chillers are operated at a capacity to meet building load in the most efficient manner.

FIG. 7 shows how controller 30 determines the lowest cost combination of machines to meet building load. The sequence of steps shown in FIG. 6 is the sequential addition method referred to in FIG. 7 and is accomplished by ranking the machines in the order of ascending minimum cost until the capacity of these ranked machines balances the building load and calculates the cost of those machines to meet building load.

Next, controller 30 determines whether or not any single machine can meet building load conditions. For example, under the sequential addition method, it may be determined that machines 1 and 2 are sufficient to meet building loads and result in minimum cost according to the procedure established in FIG. 6. However, controller 30 may also determine that building load can be met by a single machine operated at a higher capacity. Therefore, controller 30 selects all machines which by themselves can meet building load and determines which of those selected machines is the lowest cost machine to meet building load. Thus, if a single machine can carry the load and once controller 30 has determined which machine can carry the load at lowest cost, controller 30 determines whether or not the sequential addition method machines or the single machine is lowest in cost. The lowest cost approach is then adopted and the selected machine or machines are run.

If a single machine cannot carry the load then the minimum cost and minimum number method is used. In this method, controller 1 takes machine 1 found in the sequential addition method and then looks for a second machine which, when added to machine 1, will meet building load requirements. In this search for the second machine, if controller 30 finds a number of machines any one of which when added to machine 1 can meet building load requirements, it selects the lowest cost second machine and adds that to machine 1. If two machines will not meet building load, then controller 30 selects machines 1 and 2 found from the sequential addition method and looks for a third machine, and so on until the minimum cost and minimum number of machines have been selected. Then the cost derived from the sequential addition method is compared to the cost of the minimum cost and minimum number method. If the sequential addition cost is less, then controller 30 will use the machines determined under the sequential addition method. If the sequential addition cost is not less, then controller 30 uses the machines determined by the minimum cost and minimum number method.

Figure 8:
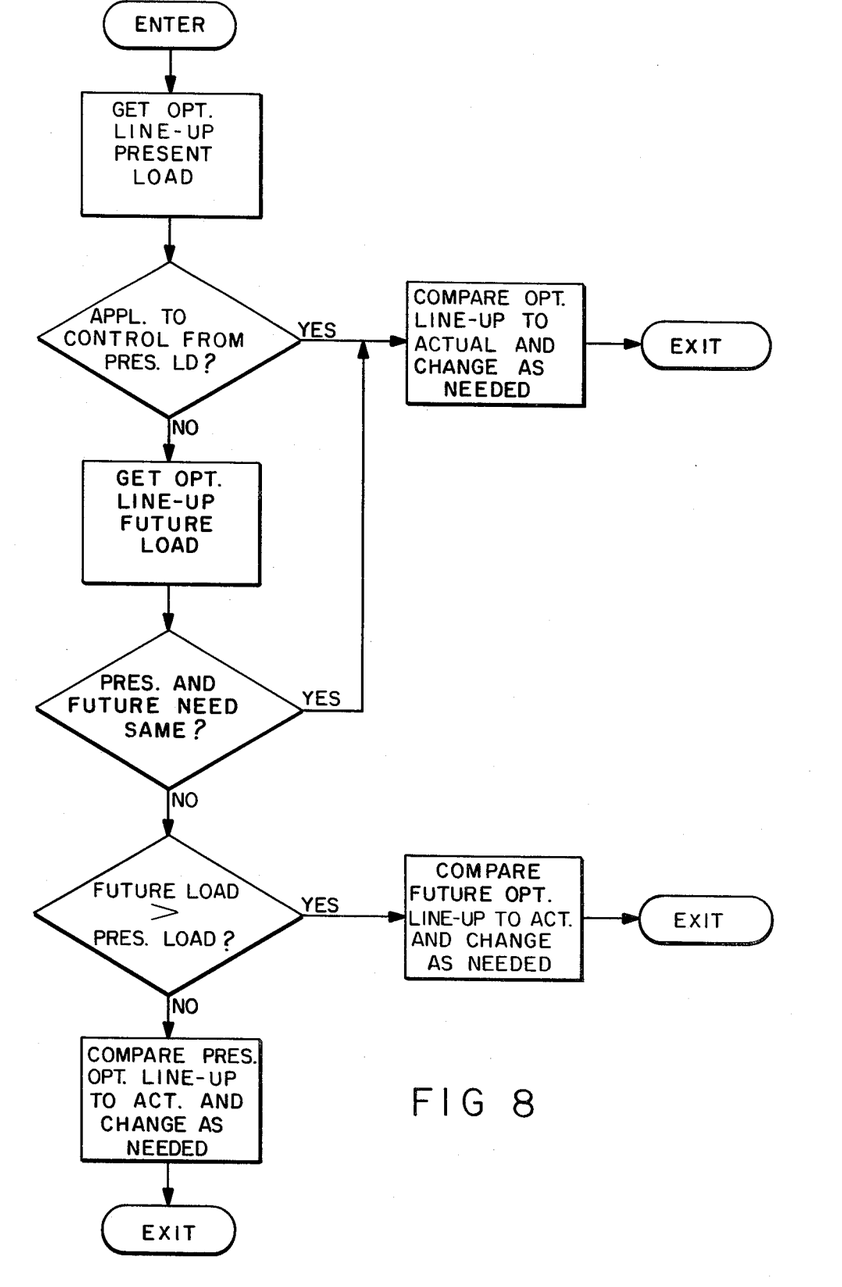

Once the machines have been selected which will result in minimum cost according to FIG. 7, FIG. 8 is then used to energize the machines. The analysis of a given load at a given refrigerant head defines what chillers should be on at what capacities to give lowest energy cost per ton of cooling done. The use of historical load profiles can help predict short term (1-3 hrs.) future load changes. The use of a predicted load change may be to anticipate a more efficient lineup requirement to give lead time to change a lineup. This type of decision process is shown in FIG. 8. This selection process involves requesting two different analyses, one for present load, and one for future load and seeing if they result in a different lineup for minimum cost.

In the first step of FIG. 8, controller 30 gets the optimized lineup of present loads or chillers by the FIG. 7 analysis and determines whether or not the present load or future load option has been selected. If the analysis of FIG. 7 is to be applied only to present load, then controller 30 compares the optimized lineup to the chillers which are actually on and will make the changes as needed to switch from the machines now on to those resulting from the FIG. 7 analysis. If, on the other hand, future loads are to be taken into account, then controller 30 does a FIG. 7 analysis for the future load. After determining the optimized lineup to meet future loads, it is next determined whether or not the present conditions and future conditions are the same. If they are, then the machines are switched over so that those machines resulting from the optimized lineup are operating. If present and future conditions are not the same then it is determined if the future load is greater than the present load. If so, the future optimized lineup is used. If not, the present optimized lineup is used.

At this point, the machines in the selected optimized lineup are operating.

It should be pointed out with respect to FIG. 2 that a common cooling tower can be used for all chillers or multiple cooling towers can be used. If multiple cooling towers are used, then the return water temperature to each tower is averaged in determining refrigerant head. Moreover, the system can determine refrigerant head for each chiller for the part load characteristics or can assume that the refrigerant head for each chiller is going to be substantially the same and, therefore, only the refrigerant head of the chiller plant needs to be determined.

A program listing for performing the operations outlined in the flow charts of this invention is attached as an Appendix hereto.

The embodiments of the invention in which an exclusive property or right is claimed are defined as follows:

1. A system for meeting building air conditioning load conditions by optimally selecting a combination of chillers, said chillers providing a supply of chilled water to said building and for receiving return water, said system comprising:
    load sensing means for sensing building load;
    refrigerant head sensing means for sensing refrigerant head of said chillers; and,
    control means connected to said load sensing means and to said refrigerant head sensing means for sorting said chillers according to their efficiency characteristic curves with the chiller having a minimum kw/ton versus capacity point being ranked first and for selecting a combination of said chillers which will require a minimum energy input to meet building load conditions.

2. The system of claim 1 wherein said control means further comprises power sensing means for sensing energy requirements of each chiller so that energy efficiency characteristic information can be stored for each of said chillers.

3. The system of claim 1 wherein said load sensing means comprises temperature sensing means for sensing the temperature of said chilled water supply of said chillers, temperature sensing means for sensing the temperature of said return water of said chillers, and means for determining flow rate of said chilled and return water.

4. The system of claim 3 wherein said refrigerant head sensing means comprises temperature sensing means for sensing the temperature of said chilled water supply and temperature sensing means for sensing condensor supply water temperature of said chillers.

5. The system of claim 4 wherein said control means further comprises power sensing means for sensing energy requirements of each chiller so that energy efficiency characteristic information can be stored for each of said chillers.

6. A system for meeting building air conditioning load conditions by optimally selecting a combination of chillers, said chillers providing a supply of chilled water to said building and for receiving return water, said system comprising:
    load sensing means for sensing building load;
    refrigerant head sensing means for sensing refrigerant head of said chillers; and,
    control means connected to said load sensing means and to said refrigerant head sensing means for sorting said chillers according to their efficiency characteristic curves with said chiller having a minimum kw/ton versus capacity point being ranked first and for selecting, by adding and subtracting predetermined steps of capacity for said chillers and selecting the combination of steps resulting in the most efficient kw/ton change, a combination of said chillers which will require a minimum energy input to meet building load conditions.

7. The system of claim 6 wherein said control means further comprises power sensing means for sensing energy requirements of each chiller so that energy efficiency characteristic information can be stored for each of said chillers.

8. The system of claim 6 wherein said load sensing means comprises temperature sensing means for sensing the temperature of said chilled water supply of said chillers, temperature sensing means for sensing the temperature of said return water of said chillers, and means for determining flow rate of said chilled and return water.

9. The system of claim 8 wherein said refrigerant head sensing means comprises temperature sensing means for sensing the temperature of said chilled water supply and temperature sensing means for sensing condensor supply water temperature of said chillers.

10. The system of claim 9 wherein said control means further comprises power sensing means for sensing energy requirements of each chiller so that energy efficiency characteristic information can be stored for each of said chillers.

11. A system for meeting building air conditioning load conditions by optimally selecting a combination of chillers, said chillers providing a supply of chilled water to said building and for receiving return water, said system comprising:
    load sensing means for sensing building load;
    refrigerant head sensing means for sensing refrigerant head of said chillers; and,
    control means connected to said load sensing means and to said refrigerant head sensing means for storing energy efficiency characteristic data by predetermined refrigerant heads for each chiller, for sorting said chillers according to said energy efficiency characteristic data with said chiller having a minimum kw/ton versus capacity point being ranked first, and for selecting a combination of said chillers which will require a minimum energy input to meeting building load conditions.

12. The system of claim 11 wherein said control means further comprises power sensing means for sensing energy requirements of each chiller so that said energy efficiency characteristic data can be stored for each of said chillers.

13. The system of claim 11 wherein said load sensing means comprises temperature sensing means for sensing the temperature of said chilled water supply of said chillers, temperature sensing means for sensing the temperature of said return water of said chillers, and means for determining flow rate of said chilled and return water.

14. The system of claim 13 wherein said refrigerant head sensing means comprises temperature sensing means for sensing the temperature of said chilled water supply and temperature sensing means for sensing condensor supply water temperature of said chillers.

15. The system of claim 14 wherein said control means further comprises power sensing means for sensing energy requirements of each chiller so that said energy efficiency characteristic data can be stored for each of said chillers.

16. A system for meeting building air conditioning load conditions by optimally selecting a combination of chillers, said chillers providing a supply of chilled water to said building and for receiving return water, said system comprising:
    load sensing means for sensing building load;
    refrigerant head sensing means for sensing refrigerant head of said chillers; and, control means connected to said load sensing means and to said refrigerant head sensing means for storing tables of energy efficiency characteristic data by predetermined refrigerant heads for each chiller, refrigerant heads for each chiller, for sorting said chillers according to their energy efficiency characteristic data with said chiller having a minimum kw/ton versus capacity point being ranked first, and for selecting, by adding and subtracting predetermined steps of capacity for said chillers and selecting the combination of steps resulting in the most efficient kw/ton change, a combination of said chillers which will require a minimum energy input to meet building load conditions.

17. The system of claim 16 wherein said control means further comprises power sensing means for sensing energy requirements of each chiller so that said energy efficiency characteristic data can be stored for each of said chillers.

18. The system of claim 16 wherein said load sensing means comprises temperature sensing means for sensing the temperature of said chilled water supply of said chillers, temperature sensing means for sensing the temperature of said return water of said chillers, and means for determining flow rate of said chilled and return water.

19. The system of claim 18 wherein said refrigerant head sensing means comprises temperature sensing means for sensing the temperature of said chilled water supply and temperature sensing means for sensing condensor supply water temperature of said chillers.

20. The system of claim 19 wherein said control means further comprises power sensing means for sensing energy requirements of each chiller so that said energy efficiency characteristic data can be stored for each of said chillers.

21. A system for meeting building air conditioning load conditions by optimally selecting a combination of chillers, said chillers providing a supply of chilled water to said building and for receiving return water, said system comprising:

load sensing means for sensing building load;

refrigerant head sensing means for sensing refrigerant head of said chillers; and, control means connected to said load sensing means and to said refrigerant head sensing means for storing tables of energy efficiency characteristic data by predetermined refrigerant heads for each chiller, for sorting said chillers according to their energy efficiency characteristic data with said chiller having a minimum kw/ton versus capacity point being ranked first, and for selecting, in a sequential addition method, by adding and subtracting predetermined steps of capacity for chillers and selecting the combination of steps resulting in the most efficient kw/ton change, a combination of said chillers which will require a minimum energy input to meet building load conditions, for determining the lowest cost single machine which can meet load and using the lower cost of the sequential addition method or the single machine to meet building load, and, if a single machine is insufficient, adding to the first machine found in the sequential addition method another chiller or combination of chillers resulting in minimum cost and minimum number of chillers to meet building load, and for using the chillers resulting in minimum cost and minimum number of chillers or the chillers selected in the sequential addition method whichever results in minimum cost.

* * * * *